United States Patent
Stern et al.

[19]

[11] Patent Number: 6,065,255
[45] Date of Patent: May 23, 2000

[54] ROOF MOUNTING FOR PHOTOVOLTAIC MODULES

[75] Inventors: Michael J Stern, Thousand Oaks; Gilbert Duran, Chatsworth; Kevin K. Mackamul, Simi Valley, all of Calif.

[73] Assignee: Kyocera Solar, Inc., Scottsdale, Ariz.

[21] Appl. No.: 09/206,739

[22] Filed: Dec. 7, 1998

[51] Int. Cl.[7] .................................................. E04D 13/18
[52] U.S. Cl. .......................... 52/173.3; 52/220.3; 52/480; 52/483.1; 52/668; 52/669
[58] Field of Search ............................... 52/173.3, 220.3, 52/220.4, 480, 668, 669, 483.1, 489.1, 489.2, 781; 174/48, 49, 97, 99 R, 101; 126/621, 622, 623; 248/235; 182/82

[56] References Cited

U.S. PATENT DOCUMENTS

| | | | |
|---|---|---|---|
| 749,440 | 1/1904 | Jackson | 52/483.1 |
| 1,214,928 | 2/1917 | Lachman | 52/668 |
| 4,621,472 | 11/1986 | Kloke | 52/204.591 |
| 5,125,608 | 6/1992 | McMaster et al. | 52/173.3 |
| 5,555,699 | 9/1996 | Borthick et al. | 52/668 |
| 5,935,343 | 8/1999 | Hollick | 126/621 |

*Primary Examiner*—Michael Safavi
*Attorney, Agent, or Firm*—Daniel C. McKown

[57] ABSTRACT

A structure for mounting a planar array of photovoltaic panels to a roof is formed from a set of parallel spaced juxtaposed rails which are intersected by a set of parallel spaced juxtaposed runners that extend perpendicular to the rails. Both the runners and the rails are formed of sheet metal and are shaped in cross section so as to partially surround a space. Both the rails and the runners have upwardly opening apertures bordered by flanges. The flanges of the rails are coplanar with the flanges of the runners. The photovoltaic modules rest on the flanges, thereby covering the apertures and enclosing the space within the rails and the runners. This space serves as a protective raceway for the electrical interconnections and wiring. Because the entire structure is a single electrical conductor, grounding of the modules is simplified. Compared to other mounting systems, the structure is lighter in weight, simpler to install, extremely strong, and protective of the electrical interconnections.

5 Claims, 2 Drawing Sheets

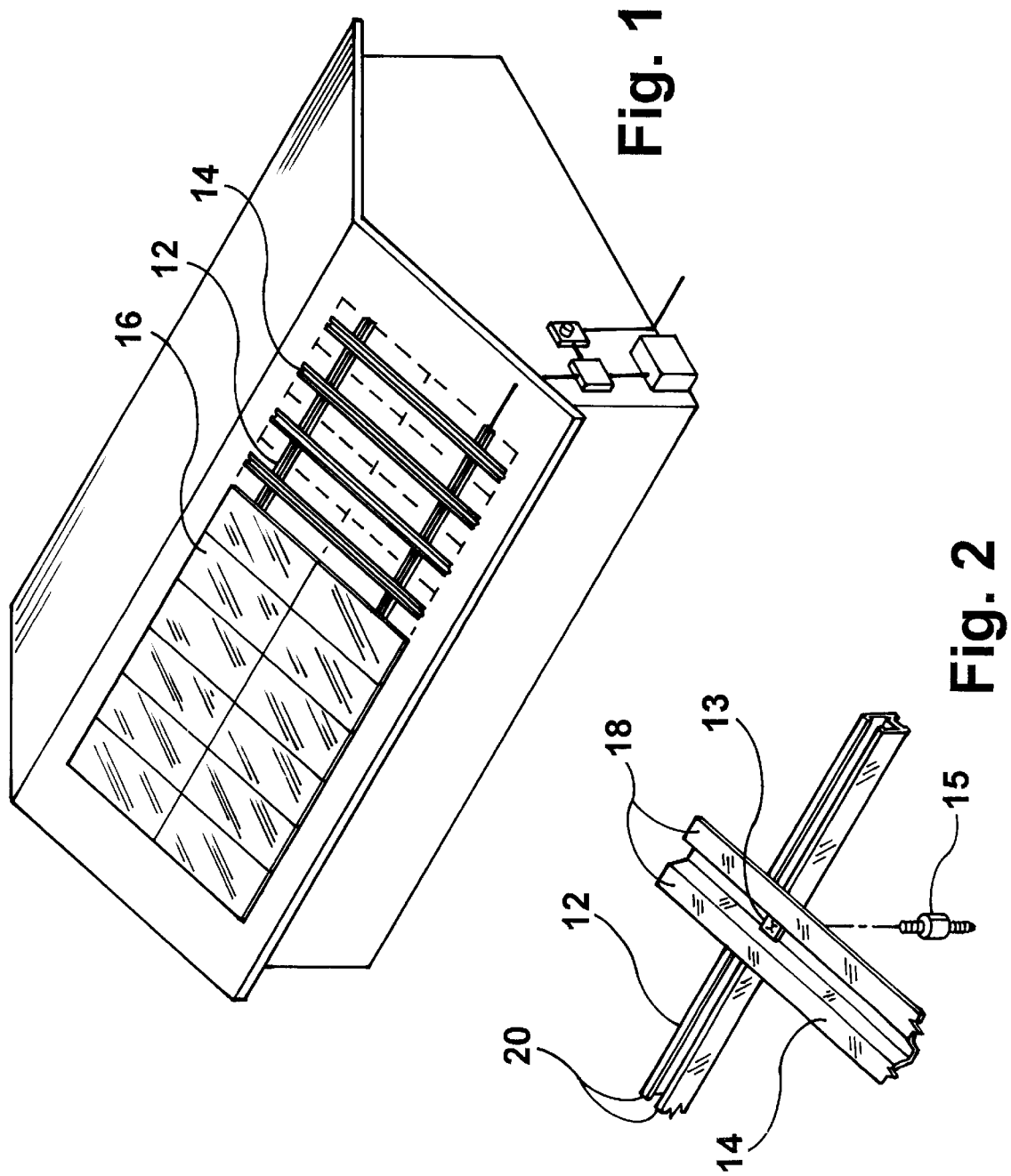

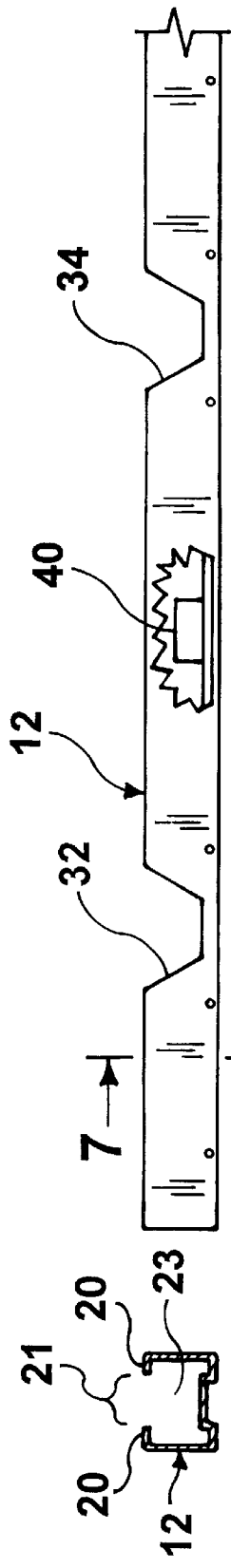
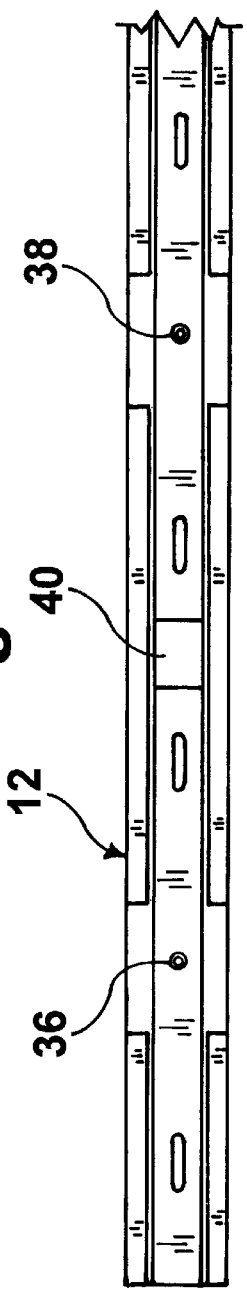
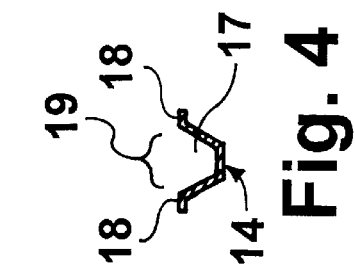
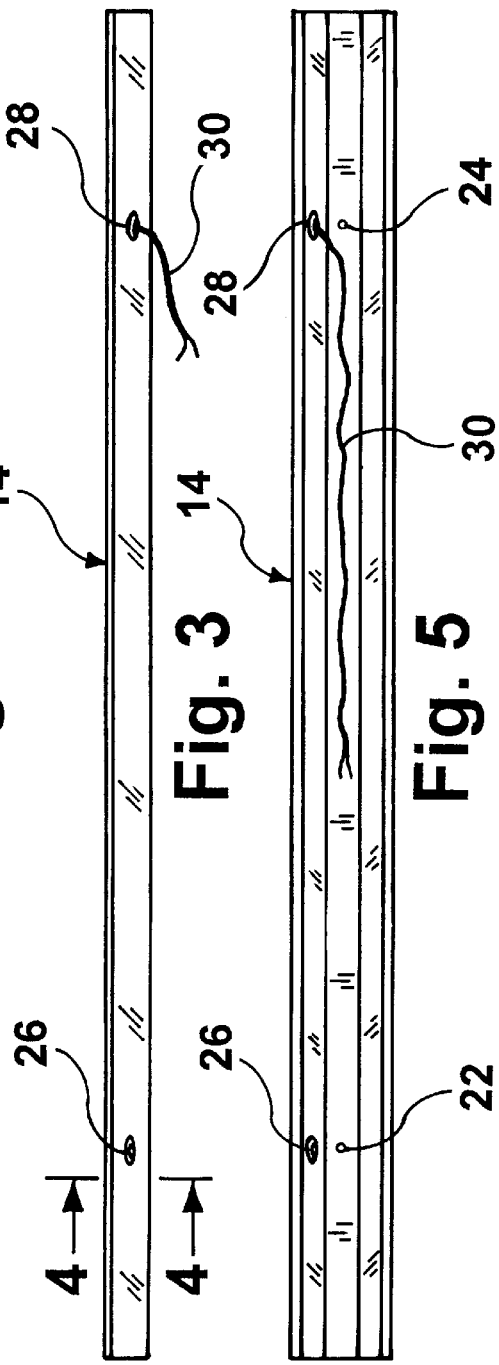

ROOF MOUNTING FOR PHOTOVOLTAIC MODULES

BACKGROUND OF THE INVENTION

1. Field of the Invention

Photovoltaic modules, which convert sunlight into electrical power, are available in the form of thin sheets of a rigid material, such as glass, plastic, metal, or some combination of these, that typically measure one to four feet in width and four to six feet in length. A number of such modules typically are formed into panels and mounted onto the roof of a building, and the electrical outputs of the panels are combined and processed before being used on site or fed into the electrical power grid. The present invention is an improved structure for mechanically affixing the modules to the roof of a building.

2. The Prior Art

In German Publication DE 3,247,469 A1 published Jul. 19, 1984, Melchior describes a way of mounting solar panels to a roof, in which the roof is first covered by aluminum foil. A number of parallel, spaced, upwardly inclined laths are affixed to the roof, and the solar panels are then laid down over the laths. The laths are not hollow and appear to be composed of wood. The space between the laths is bounded below by the foil-covered roof and above by the solar panels, whereby an ascending passage is formed. Air flows through the passage cooling the solar panels to improve their efficiency. To permit the cooling air to flow freely, the passages, and any electrical components in them, must remain open to the weather. Also, each panel must be connected to a common ground bus.

In U.S. Pat. No. 5,505,788 issued Apr. 9, 1996 to Dinwoodie, there is shown a roof mounting system comparable to that of Melchior; however, the laths of Melchior are replaced by any of a variety of solid pre-formed spacers, pedestals or supports. As with Melchior, the power-conducting wires and the grounding wires would be exposed to the weather.

U.S. Pat. No. 4,189,881 issued Feb. 26, 1980 to Hawley and U.S. Pat. No. 5,092,939 issued Mar. 3, 1992 to Nath et al. show how photovoltaic modules can be incorporated into a type of roof construction known as batten-seam construction. In each, a photovoltaic module is shown contained in the pans, between the battens, and this imposes a width limitation on the modules. Hawley teaches running the wires through the space enclosed beneath the battens.

In U.S. Pat. No. 4,760,680 issued Aug. 2, 1988 to Myers, there is shown a type of lap joint for use in making gratings. Because the beams are solid there is no suggestion of using them to enclose electrical wiring.

Thus, although a number of systems exist for attaching photovoltaic modules to roofs, none of these systems has a structure comparable to that of the present invention, from which a number of advantages flow, as will be described in detail below.

Roof attachment structures for photovoltaic power systems are an often-overlooked aspect of system design and system cost, but the roof attachment system is in fact one of the most important aspects in terms of liability in the event of water leakage or the loss of structural integrity. Additionally, roof attachment is the most labor-intensive step in the installation of a photovoltaic power system, and therefore, improvements in the ease of attachment will have a great impact on the total life cycle cost of a system. Statistics based on field experience confirm that there is much room for improvement in structures used to affix photovoltaic modules to the roof of a building.

With these needs in mind, the present inventors set out to develop an improved roof mounting system, which will be described below. It is believed that, compared with earlier systems, the structure of the present invention is lighter in weight, easier to install, and less susceptible to structural failure and to water damage.

BRIEF SUMMARY OF THE INVENTION

In accordance with the present invention the structure of the roof mounting system consists of a grid formed by the intersection of a set of parallel spaced hollow rails with a set of parallel spaced hollow runners. The photovoltaic modules form a cover for these hollow rails and runners, and the electrical interconnections are contained within the enclosed electrical raceway system, where the wiring is protected from the weather. The hollow rails and runners are preferably formed of sheet metal so that the entire structure is a single electrical conductor, thereby eliminating the need for running lengthy ground wires to the separate modules. Fasteners located at the intersections of the rails and runners attach the rails to the runners and may also attach the entire system to the roof.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE SEVERAL VIEWS OF THE DRAWING

FIG. 1 is a diagram in perspective showing the roof attachment system of the present invention installed on the roof of a building, with some of the photovoltaic modules removed to show the structure of the mounting system;

FIG. 2 is a close-up perspective view showing the intersection of a runner with a rail;

FIG. 3 is a side elevational view of a rail used in a preferred embodiment;

FIG. 4 is a cross sectional view of the rail of FIG. 3, taken in the direction 4—4 indicated in FIG. 3;

FIG. 5 is a top view of the rail of FIG. 3;

FIG. 6 is a side elevational view of a runner used in a preferred embodiment;

FIG. 7 is a cross sectional view of the runner of FIG. 6, taken in the direction 7—7 indicdi FIG. 6; and, FIG. 8 is a top plan view of the runner of FIG. 6.

DETAILED DESCRIPTION OF THE INVENTION

The present invention is a structure for mounting and supporting a planar array of photovoltaic modules on a roof FIG. 1 shows such an installation. In FIG. 1 some of the photovoltaic modules have been removed so that the structure of the invention can be seen better.

In a preferred installation one or more runners, of which the runner 12 is typical, extend horizontally across the roof. If a plurality of runners are used, they are spaced and juxtaposed. Any of a number of well known techniques can be used for affixing the runners to the roof, and in a preferred embodiment, standoffs are used to provide a space between the runners and the roof to facilitate drainage of rain water from the roof and provide enhanced heat dissipation characteristics.

A set of rails, of which the rail 14 is typical, extend perpendicular to the runners and are secured to the runners by the same fastener that affixes the runners to the roof. These fasteners are located where the rails intersect the runners. Based on the locations of the roof rafters or anchor points, additional fasteners may be required for some roofs.

In a preferred embodiment, two photovoltaic modules, of which the module 16 is typical, are associated with each rail. The length of the runners is determined by the number of rails, and the number of rails required depends on the size of the module.

FIG. 2 is an enlarged view showing the intersection of a rail 14 with a runner 12. As will be described in greater detail below, the rail extends without interruption through the intersection and the runner includes mating cutout sections to receive the rails. In this preferred embodiment, the upper flanges 18 of the rail 14 rest on the upper flanges 20 of the runner 12. Neglecting the thickness of the sheetmetal of which the rails and runners are composed, the flanges 18 and the flanges 20 lie in the same plane, which is also the plane in which the roof-facing surfaces of the modules lie.

Also visible in FIG. 2 are a standoff 15 and a fastener 13 used to secure the rail, the runner, and the standoff to the roof.

FIGS. 3, 4, and 5 show the configuration of a rail 14 of the preferred embodiment. The rail has a uniform cross section and is generally trough-shaped, as best seen in FIG. 4. This cross sectional shape partially surrounds the space 17, leaving an aperture 19 that is bounded by the flanges 18. In the preferred embodiment, each rail is long enough to accommodate two modules oriented end-to-end lengthwise along the rail.

In the preferred embodiment, the rails are 92.5 inches in length, and rails of this length are supported by two runners. The centerlines of the runners are located 16.25 inches in from the ends of each rail. At these locations, two holes 22 and 24 are provided in the bottom of each rail to accommodate the fastener used to connect the rails and runners to the roof. At the same locations along each rail two grommets 26 and 28 are provided to permit the wires 30 that carry the generated current to pass from the interior of the rail into the interior of a runner.

To expedite installation, the rails 14 are attached to the rear surface (the shady side) of the modules by mechanical fasteners or by means of a silicone-acrylic adhesive that is applied to the flanges 18. When the flanges 18 are brought into contact with the rear surface of the modules, the space 17 which had been partially surrounded by the rail 14 becomes completely enclosed and protected. The current carrying wires 30 emerge from the rear surfaces of the modules and pass into the space enclosed within the rail. The wires 30 run lengthwise within the rail and emerge from it, into a runner, through one of the grommets 26 or 28.

FIGS. 6, 7 and 8 show a representative portion of a runner 12 used in the preferred embodiment. Like the rail 14, the runner 12 is composed of sheetmetal and, except for the cut-outs 32 and 34, is of uniform cross section. The cross section of the runner 12 is shaped to partially surround a space 23 within the runner, leaving an aperture 21 bounded by the flanges 20, and the closure is completed by the rear side of the modules which lie against the flanges 20 of the runners. Holes 36 and 38 are provided in the bottom of the runner on center with the rails. A fastener extends through these holes to hold the rails to the runners and the runners to the roof In the preferred embodiment, the fastener passes through a standoff that provides a small space between the runners and the roof. Electrical junction boxes, of which the box 40 is typical, are provided in the rails to facilitate making the electrical connections. The length of the runners is determined by the number of pairs of modules that are to be mounted on the roof.

When the rails are set into the cutouts 32, 34 of the runners, the flanges 18 of the rails are substantially coplanar (neglecting the thickness of the sheet metal) with the flanges 20 of the runners. The rear surfaces of the photovoltaic models provide the covers for the apertures 19 and 21, thereby enclosing the spaces 17 and 23 and protecting them from the weather, rodents and other potential intrusions.

In the preferred embodiment, the ends of the rails and runners are sealed by sheet metal caps which may include perforations to permit air flow.

In an alternative embodiment, the flanges 20 of the runners are directed outwardly, and the sides of the runners slightly diverge upwardly. This enables the runners to nest, and simplifies production of the runners. In this alternative embodiment, both the rails and the runners can be nested for convenient shipping and storage.

After it has been assembled, the mounting system of the present invention is quite strong. This strength is derived partly from the hollow tubular shape of the rails and runners, and partly from the formation of a lap joint at each intersection of a rail and runner. In joinery it is well known that the strength of a lap joint results from the continuity of portions of each of the joined members. This type of joint also permits the use of a single fastener to hold the members together.

Thus, there has been described a structure for mounting an array of photovoltaic modules to a roof. The structure includes a set of spaced parallel rails and a set of spaced parallel runners that extend perpendicular to the rails. Both the rails and the runners have cross sectional shapes that partially surround a space leaving an aperture that is bounded by flanges. The flanges of the rails and the flanges of the runners are substantially coplanar and are mounted flush against the rear surface of the modules. Thus the modules cover the apertures so as to enclose and protect the spaces within the rails and runners from the weather.

Because, in the preferred embodiment, the structure of the present invention is composed of sheet metal, it is lighter in weight than prior structures that were composed of wood and/or angle irons. The system of rails and runners is readily mass-produced and it simplifies installation. In addition to bearing the weight of the modules and their wind loads, the mounting structure of the present invention provides a protected electrical raceway enclosure. Because the structure is a single electrical conductor when assembled, it eliminates the need to provide a separate grounding wire for each rail. As a result of these benefits, a 30 percent reduction in the total installed cost of a typical small rooftop power system is possible along with a corresponding improvement in the functionality, performance, and reliability of the system.

Although the rails and runners are composed of a sheet metal in the preferred embodiment, in alternative embodiments the rails and runners are composed of other materials, such as plastic, fiberglass, or other nonconductive materials.

These alternative materials may have advantageous properties, such as low cost, lightness of weight, or the possibility of being manufactured by an extrusion process.

The foregoing detailed description is illustrative of a preferred embodiment of the invention, and it is to be understood that additional embodiments thereof will be obvious to those skilled in the art. The embodiments described herein together with those additional embodiments are considered to be within the scope of the invention.

What is claimed is:

1. A structure for mounting and securing to a roof an array of photovoltaic modules having rear surfaces that lie in a common plane, comprising:

a plurality of rails extending parallel to each other and laterally spaced, each of said plurality of rails having a cross section that partially surrounds a space and having an aperture that extends lengthwise, said plurality of rails affixed to and transversing the rear surfaces of the modules with the apertures of the rails covered by the rear surfaces of the modules so that the space within each rail is enclosed and protected;

a runner mounted on the roof and extending perpendicular to said plurality of rails, having a cross section that partially surrounds a space, having an aperture that extends lengthwise, having cutouts spaced along its length that are shaped to receive said plurality of rails so that a lap joint is formed where said runner intersects each rail, said runner lying flush against and transversing the rear surfaces of the modules with the aperture of said runner covered by the rear surfaces of the modules so that the space within said runner is enclosed and protected.

2. The structure of claim 1 wherein said runner is affixed to the rear surfaces of the modules it traverses.

3. The structure of claim 2 wherein said runner and said plurality of rails are affixed to the rear surfaces of the modules they traverse by an adhesive.

4. The structure of claim 1 wherein said runner and said plurality of rails are composed of sheet metal.

5. The structure of claim 1 wherein said runner and said plurality of rails are composed of a nonconductive material.

* * * * *